United States Patent
Kim et al.

(10) Patent No.: US 9,566,672 B2
(45) Date of Patent: Feb. 14, 2017

(54) METHOD OF MANUFACTURING A HEAT EXCHANGER

(71) Applicant: LG ELECTRONICS INC., Seoul (KR)

(72) Inventors: Juhyok Kim, Seoul (KR); Hongseong Kim, Seoul (KR); Hanchoon Lee, Seoul (KR); Sangyeul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 14/096,203

(22) Filed: Dec. 4, 2013

(65) Prior Publication Data
US 2014/0158333 A1   Jun. 12, 2014

(30) Foreign Application Priority Data

Dec. 10, 2012 (KR) .................. 10-2012-0142452

(51) Int. Cl.
*B21D 53/08* (2006.01)
*B23P 15/26* (2006.01)
(Continued)

(52) U.S. Cl.
CPC .............. *B23P 15/26* (2013.01); *B21D 53/08* (2013.01); *B23K 1/0012* (2013.01); *F28F 1/30* (2013.01);
(Continued)

(58) Field of Classification Search
CPC ........ B23P 15/26; B21D 53/022; B21D 53/08; B21D 39/06; Y10T 29/49373; Y10T 29/4375; Y10T 29/49393; Y10T 29/49378; F28F 1/325; F28F 21/084; F28F 2275/045; B23K 1/0012
See application file for complete search history.

(56) References Cited

U.S. PATENT DOCUMENTS 4,044,443 A * 8/1977 Chartet ................ F16L 41/001
                                                     165/173
4,207,662 A * 6/1980 Takenaka ................ B23K 1/20
                                                     29/890.047
(Continued)

FOREIGN PATENT DOCUMENTS

CN           1334154           2/2002
CN        101325185 A         12/2008
(Continued)

OTHER PUBLICATIONS

International Search Report dated Mar. 12, 2014.
(Continued)

*Primary Examiner* — Jermie Cozart
(74) *Attorney, Agent, or Firm* — Ked & Associates LLP

(57) ABSTRACT

A heat exchanger and a method of manufacturing the same are provided. With the method, a tube may be inserted into a through hole formed in at least one fin coated with a filler metal, and the tube and a fin collar of the at least one fin may be joined through the filler metal by a brazing processing. A flange may not be formed on or at a top of the at least one fin collar, which protrudes vertically from a central longitudinal plane of the at least one fin. The tube may be made of aluminum (Al), and an interval between an outer circumferential surface of the tube and an inner circumferential surface of the fin collar of the at least one fin may be approximately 0.1 mm or less. Accordingly, contact resistance occurring when fabricating a fin-tube heat exchanger using a mechanical tube expansion method may be reduced, and heat transfer performance of the heat exchanger may be improved because grooves formed within the tube may not be deformed.

11 Claims, 7 Drawing Sheets

(51) Int. Cl.
  *F28F 1/30* (2006.01)
  *B23K 1/00* (2006.01)
  B21D 19/08 (2006.01)
  B21D 53/02 (2006.01)

(52) U.S. Cl.
  CPC ......... *B21D 19/088* (2013.01); *B21D 53/022* (2013.01); *B21D 53/085* (2013.01); *B23K 2201/14* (2013.01); *B23K 2203/10* (2013.01); *F28F 2275/04* (2013.01); *F28F 2275/125* (2013.01); *Y10T 29/49373* (2015.01); *Y10T 29/49375* (2015.01); *Y10T 29/49378* (2015.01)

(56) References Cited

U.S. PATENT DOCUMENTS

| | | | |
|---|---|---|---|
| 4,502,532 A | 3/1985 | Tomozaki | |
| 4,645,119 A * | 2/1987 | Haramaki | B23K 1/0012 148/24 |
| 5,097,590 A * | 3/1992 | Tokura | B21D 53/085 29/727 |
| 5,381,600 A * | 1/1995 | Patel | B21D 53/085 29/523 |
| 6,202,703 B1 | 3/2001 | Kuroda et al. | |
| 7,234,511 B1 | 6/2007 | Lesage | |
| 2006/0218791 A1* | 10/2006 | Lamkin | B21D 19/08 29/890.052 |
| 2007/0224445 A1 | 9/2007 | Hasegawa et al. | |
| 2008/0104839 A1* | 5/2008 | Chen | B21D 39/06 29/890.03 |
| 2009/0044408 A1* | 2/2009 | Lamkin | B21D 19/08 29/890.046 |
| 2010/0084114 A1 | 4/2010 | Lawrence | |
| 2011/0000254 A1 | 1/2011 | Lee | |
| 2011/0030932 A1 | 2/2011 | Tucker et al. | |

FOREIGN PATENT DOCUMENTS

| | | |
|---|---|---|
| CN | 201569328 | 9/2010 |
| CN | 102393158 | 3/2012 |
| EP | 2 871 434 | 5/2015 |
| FR | 2 455 261 | 11/1980 |
| JP | 64-027770 | 1/1989 |
| JP | 03-291160 | 12/1991 |
| JP | 08062557 | 3/1996 |
| JP | H 9-253775 | 9/1997 |
| JP | 2003-56992 | 2/2003 |
| JP | 3-407175 B2 | 5/2003 |
| JP | 2003-214791 | 7/2003 |
| JP | 2006-90612 | 4/2006 |
| WO | WO 2012/014934 | 2/2012 |

OTHER PUBLICATIONS

Final U.S. Offie Action issued in U.S. Appl. No. 14/086,133 dated Aug. 26, 2016.

European Search Report dated Jun. 13, 2016 issued in Application No. 13862992.8.

Chinese Office Action dated Jun. 22, 2016 issued in Application No. 201380064411.0 (with English Translation).

European Search Report issued in Application No. 13194697.2 dated Aug. 6, 2015.

Chinese Office Action with English Translation issued in Application 201310634512.9 dated Aug. 31, 2015.

\* cited by examiner

First forming

Second forming

Piercing

Ironing

Re-flaring

First forming

Second forming

Piercing

Ironing

METHOD OF MANUFACTURING A HEAT EXCHANGER

CROSS-REFERENCE TO RELATED APPLICATION(S)

This application claims priority to Korean patent application number 10-2012-0142452 filed in Korea on Dec. 10, 2012, the entire disclosure of which is hereby incorporated by reference herein.

BACKGROUND

1. Field

A heat exchanger and a method of manufacturing the same are disclosed herein.

2. Background

Heat exchangers and methods of manufacturing the same are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
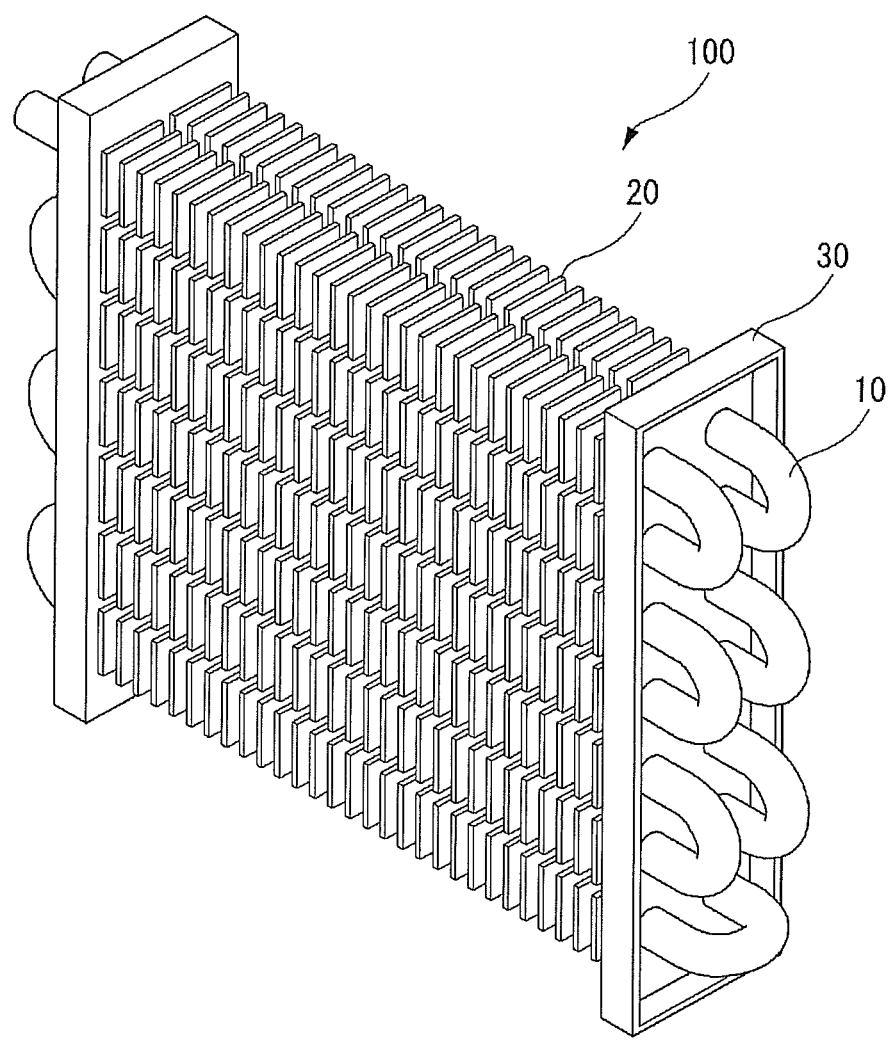
FIG. 1 is a schematic diagram of a heat exchanger using a common fin-tube method.

Hereinafter, a heat exchanger and a method of manufacturing the same in accordance with embodiments are described in detail with reference to the accompanying drawings. Where possible, like reference numerals have been used to indicate like elements, and repetitive disclosure has been omitted.

A heat exchange process between two fluids having different temperatures which are separated by a solid wall is utilized in many fields. An apparatus for enabling the transfer of heat between two or more fluids having different temperatures as described above is defined as a heat exchanger.

A detailed product of a heat exchanger may commonly refer to a condenser and an evaporator, that is, elements of a cooling cycle which are installed in an air conditioner, a refrigerator, and a show case, for example. The heat exchanger is used to perform heating or cooling by discharging or absorbing heat in response to a change in a refrigerant, that is, a heat transfer medium, depending on an installation location.

In most heat exchangers used for heating and cooling, a fin-tube method in which a plurality of cooling fins are inserted onto a refrigerant pipe (also called tube) is chiefly used. While a refrigerant is circulated within the refrigerant pipe, heat is exchanged between the refrigerant and external air through the refrigerant pipe, and at the same time, a heat exchange area is widely expanded by the plurality of cooling fins closely combined with an outer circumferential surface of the refrigerant pipe, so the heat is rapidly exchanged.

FIG. 1 is a schematic diagram of a heat exchanger using a common fin-tube method. The heat exchanger 100 of FIG. 1 includes a refrigerant pipe (or tube) 10 configured to have a refrigerant pass therethrough and curved in multiple stages, a plurality of cooling fins 20 combined with an outside of the refrigerant tube 10 and configured to improve heat exchange efficiency with air by expanding a heat exchange area, and supports 30 configured to support both ends of the refrigerant tube 10.

Figure 2:
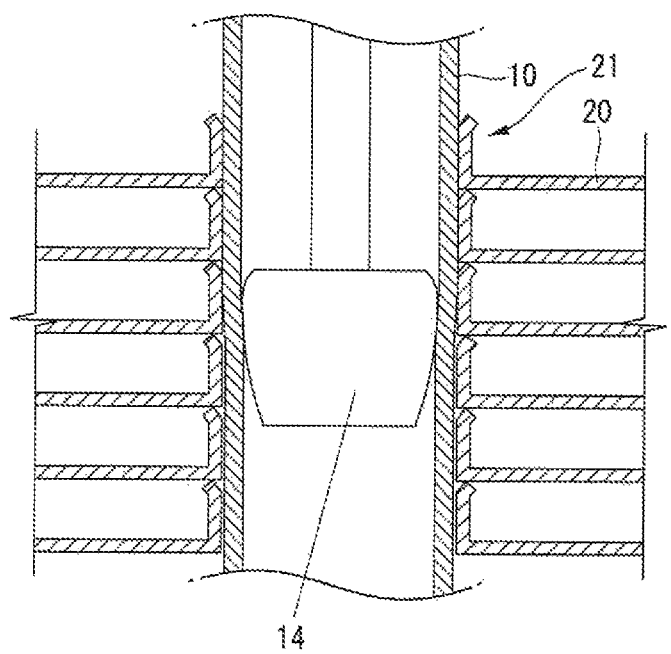
FIG. 2 is a cross-sectional view of a portion of the heat exchanger of FIG. 1 showing a state in which a tube inserted into a plurality of cooling fins is mechanically expanded by a tube expansion ball.
Figure 3A:
FIGS. 3A-3E shows a common process of forming a fin collar for a fin of a heat exchanger.
Figure 3B:
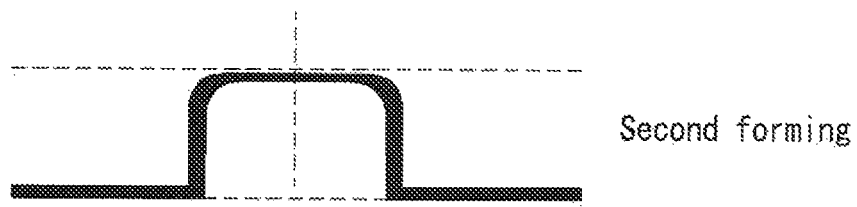
Figure 3C:
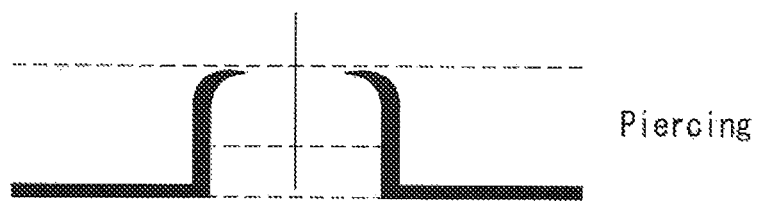
Figure 3D:
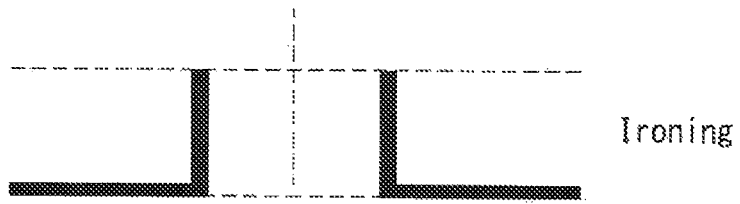
Figure 3E:
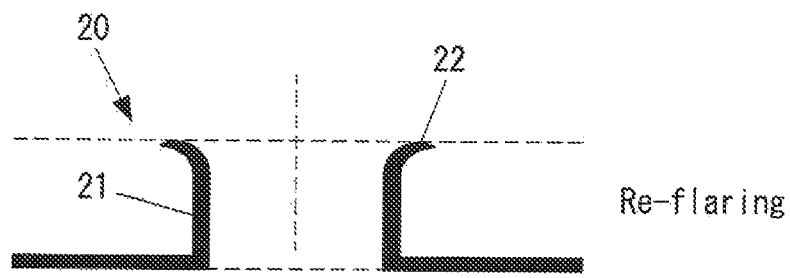

In order to reduce contact resistance between an outer circumferential surface of the refrigerant tube 10 and the plurality of cooling fins 20 by means of close coupling between them in a wide contact area, the refrigerant tube 10 is inserted into the plurality of cooling fins 20 and the inserted refrigerant tube 10 is mechanically expanded using a tube expansion ball 14, so that the refrigerant tube 10 is closely adhered to the plurality of cooling fins 20, as shown in FIG. 2. In order to insert the refrigerant tube 10 into the plurality of cooling fins 20, an external diameter of the refrigerant tube 10 needs to be smaller than an internal diameter of a fin collar formed in the plurality of cooling fins 20. In the plurality of cooling fins 20 of FIG. 2, a portion that extends parallel to the outer circumferential surface of the refrigerant tube 10 corresponds to the fin collar.

FIG. 3A-3E show a common process of forming a fin collar for a fin of a heat exchanger. The fin collar 21 is formed by first and second forming processes of expanding a portion where a through hole and the fin collar 21 will be formed from the fin 20, a process of piercing the expanded portion, a process of standing a height of the fin collar 21 and performing ironing, and a re-flaring or curling process of forming a flange or end rolling part 22 at a top of the fin collar 21.

In order to improve the heat transfer performance of the heat exchanger, grooves having or creating protrusion shapes may be processed in an inner circumferential surface of the refrigerant tube 10, that is, a circular pipe. The grooves may be deformed by a mechanical tube expansion process, and such deformation may reduce a surface area of the grooves, thereby deteriorating heat transfer performance. Further, if a fin-tube heat exchanger is fabricated using the mechanical tube expansion method, a gap may be generated between a tube and a fin, and contact heat resistance between the tube and the fin increased, leading to low heat transfer performance.

As compared with a heat exchanger using a fin-tube method to which such mechanical tube expansion is applied, a heat exchanger in which a tube and a fin are joined by brazing does not have the problem that grooves that deteriorate heat transfer performance are deformed or contact resistance is increased. Attempts have been made to apply such brazing processing to a heat exchanger using a fin-tube method, but there is a problem in that close joining between a tube and a fin is difficult because a capillary force that infiltrates or forces a filler metal for joining the tube and the fin between the tube and the fin acts irregularly.

Copper (Cu) is generally used in a tube of a heat exchanger using a fin-tube method. This is because copper (Cu) has advantages in that it has high machinability necessary to form grooves to improve heat transfer efficiency through an increase in surface area, strength necessary to reduce the crush or deformation of grooves that occurs in an expansion process, and also relatively high heat conductivity.

Metal to replace copper (Cu) is necessary because copper (Cu) is heavy and expensive. Aluminum (Al) is used in a heat exchanger using a MultiFlow (MF) channel method, that is, a kind of heat exchanger whose weight becomes an important factor, for example, in a vehicle. Aluminum (Al) has a lower heat conductivity, poorer machinability, and smaller strength than copper (Cu), but has advantages in that it is lighter and cheaper than copper (Cu).

The direct application of aluminum (Al) to the tube of a heat exchanger using a fin-tube method of joining the tube and the fin through expansion is limited because aluminum (Al) has poor machinability and smaller strength than copper (Cu). This is because it is difficult to form fine grooves within the tube. Further, heat transfer efficiency is significantly reduced because a surface area within the tube is reduced due to grooves easily crushed or deformed in an expansion process. In a heat exchanger using an MF channel method, an aluminum (Al) tube and aluminum (Al) fins are joined by a brazing method.

Brazing is described in brief hereinbelow.

Brazing is a technology in which two base metals are joined by applying heat to a filler metal, without damaging the two base metals at melting points or less of the base metals, to be joined at 450° C. or more. More particularly, a method of joining two base metals by applying heat at solidus temperature or less of the base metals using a filler metal having a liquidus temperature of 450° C. or more may be called brazing.

For reference, joining methods using a filler metal can be divided basically into welding, brazing, and soldering. A difference between the three methods is described below. Soldering refers to a method of joining metals using a filler metal having a melting point of 450° C. or less. In welding and brazing, two base metals are joined at a temperature of 450° C. or more. In welding, two base metals are joined at melting points or more of the base metals, whereas in brazing, two base metals are joined at melting points or less of the base metals by melting only a filler metal without damaging the base metals.

When brazing is performed, it is ideal that a brazing filler metal is molten between two base metals when a certain temperature (that is, the brazing temperature) is reached. A property indicative of the degree of an affinity between the two base metals and the filler metal can be represented as wetting. A phenomenon in which the brazing filler metal is made to flow between a joint gap between the two base metals can be represented as a capillary action.

In this case, gravity can act, but a main principle of brazing is that when two base metals are joined by applying a filler metal after heating the two base metals, the filler metal is molten between both the base metals by way of wetting and the filler metal flows between the base metals by way of a capillary action. If the wetting of base metals to be brazed by a filler metal is poor, joining will not be performed or accomplished. If a joint gap between two base metals is great, a filler metal is not fully filled between the two base metals, which may lead to incomplete joining.

A capillary action is a very important physical phenomenon in a brazing process. The flowability of a filler metal may depend on force by a capillary action, the viscosity and density of a molten metal, and a location of gravity with respect to a joining surface. In general, viscosity that suppresses the flow of a filler metal is correlated with temperature in a melting state. It can be seen that the flowability of a filler metal rises according to an increase in temperature. A capillary action has a very close relation with a joint gap and also has a very close correlation with the type, viscosity, and density of a solvent, the location of a joining surface and a heating method, for example.

Brazing is advantageous in that heterogeneous metal parts can be joined; products having different sizes and thicknesses can be easily joined; cost can be reduced; various parts can be designed; joining strength is relatively great in comparison to other joining; additional mechanical processing, such as grinding or filing, is not necessary because a joint is beautiful and fine and thus a clean joint can be obtained after brazing; brazing has characteristics, such as detergence, airtightness, and corrosion resistance; manual handling and automation are easy; and various types of engineering are possible because various filler metals can be formed.

Meanwhile, when forming the fin, the fin collar is formed in order to secure a contact surface between the tube and the fin and maintain a constant interval between neighboring fins, as shown in FIG. 3. However, there is a problem in that neighboring upper and lower fins overlap with each other because the external diameter of the tube is increased, while the length of the tube is reduced when the tube is inserted between the fins and mechanically expanded. In order to prevent this problem, when forming the fin collar, the flange or end rolling part is formed on or at a top of the fin collar so that a lower fin, which has not yet been expanded, supports an upper fin that is being expanded.

Embodiments disclosed herein relate to a shape of a fin collar which is suitable for joining a fin and a tube using a brazing method in a heat exchanger using a fin-tube method. If a heat exchanger using a fin-tube method is subject to brazing processing, a filler metal coated on a surface of the fin flows into a gap between the fin and the tube, thus joining the fin and the tube. To this end, it is important that a gap between the fin and the tube is a specific distance or less so that a capillary force that infiltrates or forces the filler metal into the gap between the fin and the tube may act and the capillary force may also uniformly act.

In order to join the fin and the tube through brazing, the gap between the fin and the tube needs to be approximately 0.1 mm or less so that the capillary force can act between the fin and the tube. Further, if capillary force does not uniformly act, the filler metal may be concentrated on or at a location having a greater capillary force, that is, a location where a distance between the tube and the fin is close, but the filler metal is not infiltrated into a location having a smaller capillary force, that is, a location where the distance between the tube and the fin is further apart. As a result, the fin and the tube may not be joined or may not be closely joined.

Figure 4:
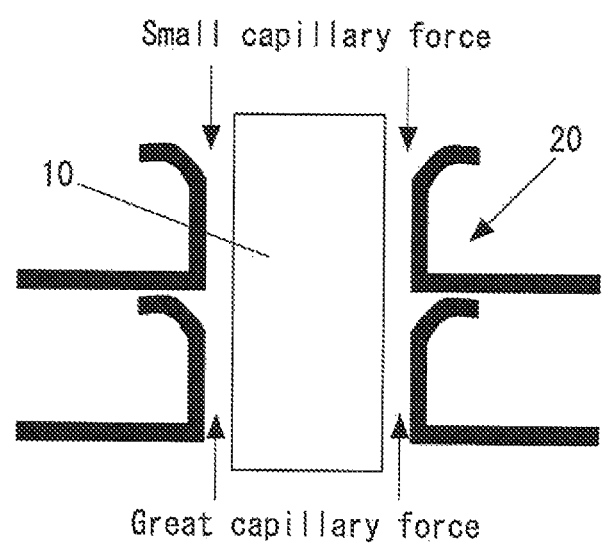
FIG. 4 shows that a small capillary force acts to infiltrate or force a filler metal into an end rolling part (or flange) formed on or at a top of a fin collar.

An interval between the fin and the tube needs to be constant such that a uniform capillary force may act between the fin and the tube. As shown in FIG. 4, the distance between the outer circumferential surface of the tube and the inner circumferential surface of the fin collar is constant to some extent, but a flange portion formed on or at a top of the fin collar in order to prevent a fin overlapping phenomenon is further apart than the inner circumferential surface of the fin collar from the outer circumferential surface of the tube. As a result, a weak capillary force acts on the flange portion and a smaller amount of filler metal may be infiltrated into the flange portion, leading to weak joining between the fin and the tube. Accordingly, it is advantageous that a flange is not present at the top of the fin collar, which is spaced further apart from the tube.

For this reason, in a fin for a heat exchanger in which the fin and a tube are joined by brazing processing, a flange on or at a top of a fin collar may be removed so that a uniform capillary force acts on a joining surface between the tube and the fin.

Figure 5:
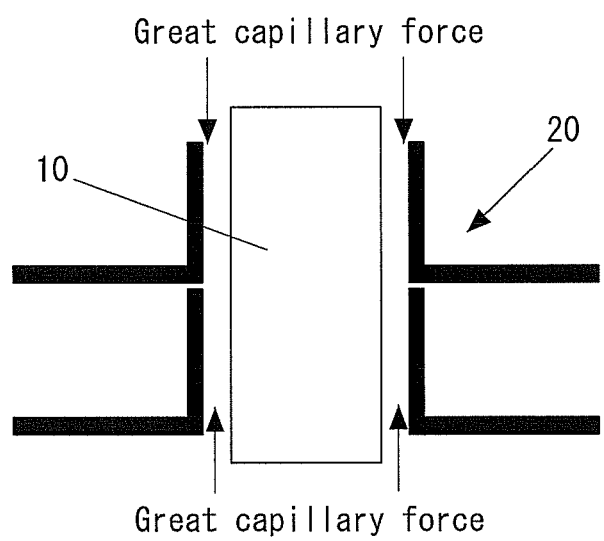
FIG. 5 shows that a capillary force uniformly acts between fin collars and a tube formed in accordance with embodiments.
Figure 6A:
FIGS. 6A-6D show a process of forming a fin collar for a fin in accordance with embodiments.
Figure 6B:
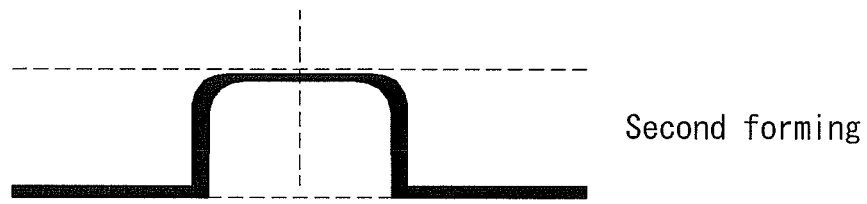
Figure 6C:
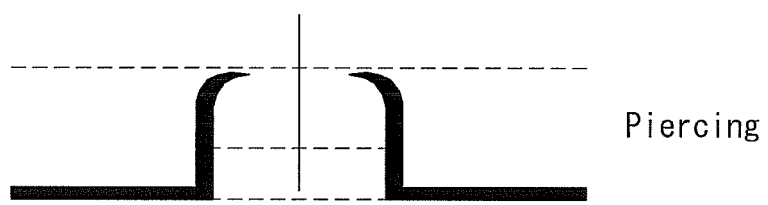
Figure 6D:
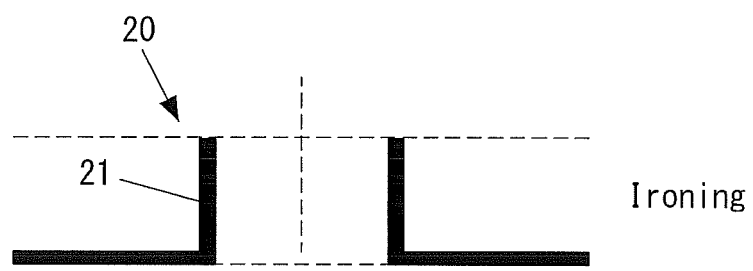

FIG. 5 shows that a capillary force uniformly acts between fin collars and a tube formed in accordance with embodiments. As a flange is not formed on or at a top of the fin collar, an interval between the tube and the fin is constant, and thus, the capillary force that infiltrates or forces the filler metal into the gap between the tube and the fin may be constant and strong.

FIGS. 6A-6D shows a process of forming a fin collar for a fin in accordance with an embodiment. The process of forming the fin collar is described in detail with reference to FIGS. 6A-6D.

A fin 20 for a heat exchanger according to embodiments may be fabricated by a first forming process of forming a conical forming part by drawing a thin aluminum (Al) plate that forms the fin 20, a second forming process of further standing a pillar of the conical forming part almost at a right angle and flattening a top of the cone, a piercing process of forming a through hole at the top of the conical forming part having a specific height, and an ironing process of spreading wrinkles on upper parts of the fin collar 21 generated while forming the through hole, trimming the upper parts so that the fin collar 21 is vertical or extends substantially vertically with respect to the fin 20, and extending the upper part in a heightwise direction.

As compared with the process of fabricating a fin for a heat exchanger using a fin-tube method shown in FIGS. 3A-3E, a re-flaring or curling process of forming the end rolling part or the flange 22 by bending the top of the fin collar 21 after the ironing process is omitted from the embodiment of FIGS. 6A-6D.

Alternatively, the fin 20 for a heat exchanger according to embodiments may be fabricated by a piercing process of piercing a through hole in the fin 20 without forming a conical forming part, a burring process of protruding peripheries of the pierced through hole to some extent, and an ironing process of forming a portion, protruded while expanding a diameter of the through hole, into the fin collar 21 having a specific height. The fin collar of the fin 20 for a heat exchanger according to embodiments may also be formed using a conventional collar forming method, such as a drawing forming method, a non-drawing forming method, a single cycle method, or a high fin method which does not include a process of forming a flange.

The heat exchanger 100 in accordance with embodiments, as shown in FIG. 1, may include a plurality of fins 20 each configured to have a flat panel shape, one or more tubes 10 configured to penetrate the plurality of fins 20, and supports 30 configured to support both ends of the one or more tubes 10. Unlike in a heat exchanger using an MF channel method, in the heat exchanger according to embodiments, the fins 20 are not placed between the tubes 10, but rather, the tube(s) 10 penetrates the fins 20.

Each fin 20 having a rectangular and flat panel shape may function to increase an area where heat is exchanged between a refrigerant flowing within the tube 10 and an external fluid. The fins 20 may be spaced apart from one another at specific intervals so that neighboring fins face each other.

A through hole into which the tube 10 may be inserted may be formed in each of the fins 20. If a plurality of the tubes 10 are inserted into the through holes, a plurality of through holes may be formed at an interval equal to a distance at which the tubes 10 are disposed in a lengthwise direction of the fins 20.

The fin collar 21 having a tubular shape may be formed in each fin 20. The fin collar 21 may substantially correspond to the outer circumferential surface of the tube 10 and extend at a substantially right angle to a plane that forms the fin 20. The fin collar 21 may be closely adhered to the outer circumferential surface of the tube 10 that penetrates the fin 20, thus increasing a joining area between the tube 10 and the fin 20.

The tube 10 may be inserted into each of the fins 20 in a state in which a front end of the fin collar 21 of each fin 20 comes in contact with a neighboring fin 20, and the fins 20 into which the tube 10 has been inserted are spaced apart from each other at an interval corresponding to a height of the fin collar 21. Accordingly, the fin collar 21 may maintain an interval between two neighboring fins 20.

The through hole needs to be formed greater than an external diameter of the tube 10 which will be inserted into the through hole. That is, an internal diameter of the fin collar 21 parallel to the through hole needs to be greater than an external diameter of the tube 10. If the internal diameter of the fin collar 21 is much greater than the external diameter of the tube 10, the tube 10 may be smoothly inserted into the through hole, but joining between the tube 10 and the fins 20 through the fin collars 21 becomes difficult. If the internal diameter of the fin collar 21 is much smaller than the external diameter of the tube 10, the insertion of the tube 10 may be difficult, and the fins 20 spaced apart from one another at specific intervals may be distorted while inserting the tube 10 into the through holes.

Two or more grooves may be formed in an inner surface of the tube 10 in a lengthwise direction thereof in order to improve heat transfer efficiency. The grooves may be formed parallel in a straight line in the lengthwise direction or may be formed as curved lines in a helical form.

A process of fabricating the heat exchanger according to embodiments may basically include a process of inserting a tube into a plurality of fins and a process of joining the plurality of fins and the tube through brazing. A process of inserting the tube 10 into a plurality of the fins 20 fabricated using the method of FIGS. 6A-6D and joining the tube 10 and the fins 20 through brazing is described below.

First, the tube 10 may be combined with the plurality of fins 20, which may be stacked and spaced apart from each other at an interval corresponding to a height of the fin collar 21. When the tube 10 sequentially penetrates the through holes formed in the plurality of fins 20, the outer circumferential surface of the tube 10 and the inner circumferential surfaces of the fin collars 21 may be placed or oriented so that they are substantially neighbors to or face each other.

In order to insert the tube 10 into the plurality of fin 20, a specific gap is necessary between the fins 20 and the tube 10. If a gap between the inner circumferential surface of the fin collar 21 and the outer circumferential surface of the tube 10 corresponding to the inner circumferential surface is great, the tube 10 may be smoothly inserted into the through hole of the fin 20, but joining between the tube 10 and the fin 20 is weakened because a capillary force that infiltrates or forces a filler metal between the tube 10 and the fin 20 in a brazing processing is small. In contrast, if the gap between the inner circumferential surface of the fin collar 21 and the outer circumferential surface of the tube 10 corresponding to the inner circumference surface is small, a filler metal may be uniformly infiltrated between the tube 10 and the fin 20 because the capillary force that acts on the filler metal in the brazing processing is increased, and thus, the tube 10 and the fin 20 are strongly joined, but it is not easy to insert the tube 10 into the fin 20.

According to embodiments disclosed herein, the through hole of the fin 20 and the fin collar 21 may be formed such that a gap between the inner circumferential surface of the fin collar 21 and the outer circumferential surface of the tube 10 corresponding to the inner circumferential surface is approximately 0.1 mm or less. Accordingly, the tube 10 may be inserted into the fins 20 through the through holes of the stacked fins 20, and the tube 10 and the fins 20 may be closely joined by means of brazing after the tube 10 is inserted into the fins 20.

Figure 7A:
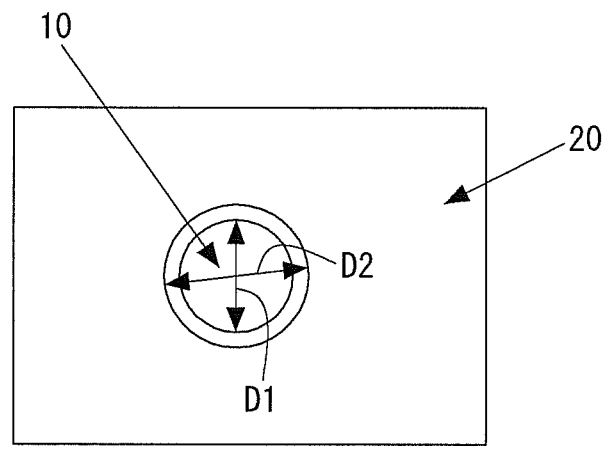
FIGS. 7A-7B show a gap between a fin and a tube in a heat exchanger fabricated according to embodiments.
Figure 7B:
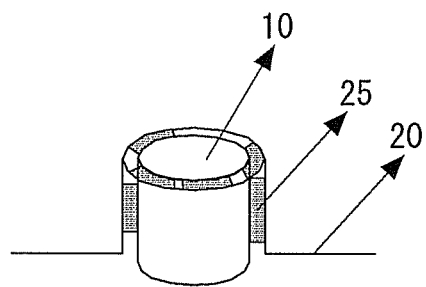

FIGS. 7A-7B shows a gap between a fin and a tube in a heat exchanger fabricated according to embodiments and a state in which the fin and the tube are joined by a filler metal. It is advantageous to form the through hole of the fin 20 and the fin collar 21 such that a gap between the tube 10 and the fin collar 21 becomes approximately 0.1 mm or less, that is, D2-D1≤0.1 mm assuming that an external diameter of the tube 10 is D1 and an internal diameter of the fin collar 21 is D2 in FIGS. 7A-7B.

The assembly of the tube 10 and the fin 20 is subject to brazing processing in a brazing furnace, so the tube 10 and the fin 20 are joined. A filler metal 25 for joining the tube 10 and the fin 20 may be coated on a surface of the fin 20, and the filler metal 25 coated on an inside of the fin collar 21 of the fin 20 is molten by brazing processing and then hardened, with the result that the tube 10 and the fin collar 21 are closely joined.

The filler metal 25 may be coated on both surfaces of the fin 20 made of aluminum (Al), or may be coated on only one surface of the fin 20 which will be joined with the tube 10. In the latter case, the fin collar 21 may be formed by forming a through hole from a surface of the fin 20 on which the filler metal 25 has been coated so that the filler metal 25 is coated on the inner circumferential surface of the fin collar 21. Or after forming the fin collar 21, the filler metal 25 may be coated on both surfaces of the fin 20 or only on one surface of the fin 20 in which the fin collar 21 is formed. Alternatively, the filler metal 25 may be formed only at a location where the through hole and the fin collar 21 will be formed without coating the filler metal 25 on the entire fin 20.

FIG. 7B shows a state in which the filler metal 25 molten by brazing has joined the outer circumferential surface of the tube 10 and the inner circumferential surface of the fin collar 21. If a gap between the outer circumferential surface of the tube 10 and the inner circumferential surface of the fin collar 21 is uniform after expansion, a joining area may be increased because the filler metal 25 is uniformly infiltrated between the outer circumferential surface of the tube 10 and the inner circumferential surface of the fin collar 21 by way of capillary force.

In the heat exchanger according to embodiments, brazing processing is used as a method of joining the tube 10 and the fins 20, instead of expanding the tube 10. Accordingly, heat transfer efficiency is not reduced because grooves formed in an inner surface of the tube 10 are not crushed, and thus, aluminum (Al) having relatively lower strength than copper (Cu) may be used in the tube 10.

In the heat exchanger according to embodiments, contact resistance between the fin and the tube may be reduced by brazing, and the grooves within the tube are not crushed because expansion is not performed and thus a heat transfer sectional area is widened. Accordingly, heat transfer performance may be improved.

As described above, in accordance with embodiments disclosed herein, contact resistance generated when fabricating a fin-tube heat exchanger using a mechanical tube expansion method may be reduced, and heat transfer performance of a heat exchanger may be improved because grooves formed within a tube are not deformed.

Embodiments disclosed herein improve heat transfer performance of a heat exchanger. Further, embodiments disclosed herein provide a heat exchanger in which filler metal is uniformly infiltrated between cooling a tube and a fin so that brazing is well performed. Additionally, embodiments disclosed herein provide a method of forming cooling fins that enable brazing to be well performed.

Embodiments disclosed herein provide a method of manufacturing a heat exchanger that may include inserting a tube into a through hole formed in a fin coated with a filler metal, and joining the tube and the fin collar of the fin through the filler metal by brazing processing. A flange may not be formed on or at a top of the fin collar vertically protruded from a plane that forms the fin in the through hole.

Embodiments disclosed herein further provides a heat exchanger that may include a tube configured to include a plurality of grooves formed within the tube and a plurality of fins each configured to have at least one through hole formed within the fin so that the tube is inserted into the through hole and to have a fin collar which is vertically bent near the through hole and on a top of which a flange is not formed. The plurality of fins may be disposed in parallel at an interval corresponding to a height of the fin collar, and an inner circumference surface of the fin collar may be joined with the outer circumference surface of the tube by a filler metal. The tube may be made of aluminum (Al). An interval between the outer circumference surface of the tube and the inner circumference surface of the fin collar may be approximately 0.1 mm or less. The filler metal may be coated on only one surface of the fin or may be coated on only a portion where the through hole is formed.

The embodiments have been disclosed for illustrative purposes, and those skilled in the art may improve, change, replace, or add various other embodiments within the technical spirit and scope disclosed in the attached claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of manufacturing a heat exchanger, the method comprising:
   inserting a tube into a through hole formed in at least one fin coated with a filler metal; and
   joining the tube and a fin collar of the at least one fin through the filler metal by a brazing processing, wherein the through hole and the fin collar of the at least one fin is formed by:
   forming a conical portion in the at least one fin;
   flattening an upper portion of the conical portion to form a substantially flat top;
   piercing the substantially flat top portion to form the through hole and the fin collar; and
   ironing the fin collar without forming a flange on or at a top of the fin collar, which protrudes vertically from a central longitudinal plane of the at least one fin.

2. The method of claim 1, wherein the tube is made of aluminum (Al).

3. The method of claim 2, wherein the at least one fin is made of Al.

4. The method of claim 1, wherein an interval between an outer circumferential surface of the tube and an inner circumferential surface of the fin collar of the at least one fin is approximately 0.1 mm or less.

5. The method of claim 1, wherein the fin collar of the at least one fin extends at a substantially 90° angle with respect to a central longitudinal axis of the at least one fin.

6. The method of claim 1, wherein the filler metal is coated on only one surface of the at least one fin.

7. The method of claim 6, wherein the filler metal is coated on only a portion of the at least one fin where the through hole is formed.

8. The method of claim 6, wherein the filler metal is coated on an inner circumferential surface of the fin collar of the at least one fin.

9. The method of claim 1, further including:
   expanding the tube prior to the joining.

10. The method of claim 9, wherein the expanding the tube prior to the joining includes expanding the tube, using a tube expansion ball.

11. The method of claim 1, wherein the fin collar is formed to have a tubular shape.

* * * * *